United States Patent [19]

Kobayashi

[11] Patent Number: 5,019,310
[45] Date of Patent: May 28, 1991

[54] METHOD FOR MAKING MOLDED SOLID BODY OF INCINERATED WASTE MATERIAL

[75] Inventor: Yoshikazu Kobayashi, Hiroshima, Japan

[73] Assignee: Kabushiki Kaisha Miike Tekkosho, Hiroshima, Japan

[21] Appl. No.: 275,425

[22] Filed: Nov. 23, 1988

[30] Foreign Application Priority Data

Dec. 28, 1987 [JP] Japan .................................. 62-334282
Aug. 22, 1988 [JP] Japan .................................. 63-207739

[51] Int. Cl.$^5$ ........................................... B29B 11/10
[52] U.S. Cl. .................................... 264/122; 264/125; 264/141; 264/211.23; 264/DIG. 69; 425/192 R; 425/202; 425/204
[58] Field of Search ................... 264/211.23, 211.21, 264/349, 122, DIG. 69, 141, 37, DIG. 49, 142, 143, 125; 425/203, 209, 202, 205, 204, 192 R

[56] References Cited

U.S. PATENT DOCUMENTS

| | | | |
|---|---|---|---|
| 3,865,916 | 2/1975 | Visser et al. | 264/117 |
| 4,252,667 | 2/1981 | Stegmaier et al. | 425/203 |
| 4,280,922 | 7/1981 | Puthawala et al. | 425/203 |
| 4,427,818 | 1/1984 | Prusinski | 524/442 |

FOREIGN PATENT DOCUMENTS

| | | | |
|---|---|---|---|
| 2323882 | 12/1973 | Fed. Rep. of Germany | 425/202 |
| 2615610 | 10/1977 | Fed. Rep. of Germany | 264/DIG. 69 |
| 54-34365 | 3/1979 | Japan | 264/141 |
| 62-54200 | 3/1987 | Japan | 264/37 |
| 63-11309 | 1/1988 | Japan | 264/141 |
| 2171638A | 9/1986 | United Kingdom | 425/202 |

*Primary Examiner*—Jeffery Thurlow
*Attorney, Agent, or Firm*—Koda and Androlia

[57] ABSTRACT

A molded solid body of incinerated waste material and a method of making the same, which is formed by binding ash-like incinerated waste material with solidifiable molten plastic waste material and extruding a mixture of the same into a bar-like shape. The molded solid body is dense and rigid having a high rate of specific gravity so that it can consistently remain at a particular location regardless of environmental pollution when disposed in the sea and also, be used as a structural material for concrete and asphalt construction. According to the making method, two kinds of waste materials are processed at one time and reduced in volume to a rate ranging from 1/10 to 1/20, whereby the efficiency for transportation and disposal can be improved greatly.

1 Claim, 3 Drawing Sheets 5,019,310

METHOD FOR MAKING MOLDED SOLID BODY OF INCINERATED WASTE MATERIAL

BACKGROUND OF THE INVENTION

1. Field of the Invention

The present invention relates to the recovery or recycling of plastic waste material and incinerated waste material provided in ash form from incinerators in a thermal disposal plant and, more particularly, to a positively reusable molded solid body of incinerated waste material formed by binding the ash-like incinerated waste material with plastic waste material and a method for making the same.

2. Prior Art

It is known that as the style of living and framework of industry are changing in various ways nowadays, common household and industrial waste increases in volume and varys in nature. There is thus required a method of disposal corresponding to the disposal capacity of a large-scaled disposal plant and also, the nature of waste. Plastic materials are widely used in the form of a food package, packing case, or container and thus, will be recovered in bulk at such a thermal disposal plant. Specifically, the ash-like incinerated waste is diverse in properties and contains incombustible substances and hostile materials such as heavy metals.

The plastic waste material is hardly decayed in a normal condition and particularly, when burnt, produces a high temperature in the incinerator which is thus damaging to the floor and wall and also, produces toxic gases. Additionally, the plastic waste material is so bulky as to take up much space for storage or reclamation and can be handled with difficulty.

The incinerated waste, when being kept in ash form and dumped on the ground, will disperse with blowing of wind and be washed away by rainwater. The ash-like incinerated waste is then buried for land-fill work or thrown away into the sea for disposal. However, the toxic heavy metal substances contained in the incinerated waste intend to remain in the ground and will be carried away by the rainwater into rivers, lakes and wells which are then contaminated. Accordingly, the pollution of water results in ennvironmental comtamination as the sea water is also polluted. It is known that to prevent the pollution, the ash-like incinerated waste material is bound with cement material to recover in the form of monolithic concrete blocks. The concrete blocks are however critical in rigidity and thus, unsuitable to use in civil engineering works. In practice, such blocks are utilized only for land-fill works. Hence, it is disadvantageous in respect of both economical and operative view points to employ cement material as a solidifiable medium for the purpose of reclamation. There has been required a novel method to tackle the problems.

SUMMARY OF THE INVENTION

The present invention is directed, in view of the aforesaid respects, towards the principles of processing at one time both ash-like incinerated waste material and plastic waste material with the use of a binding machine or screw extruder for improvement of the processing efficiency and effectively reclaiming the waste materials to use as structural materials for concrete or asphalt construction, common constructional wall or floor materials, thermal insulating materials, etc.

DETAILED DESCRIPTION OF THE INVENTION

A molded solid body of incinerated waste material according to the present invention is formed by binding the ash-like incinerated waste material with solidifiable molten plastic (waste) material and extruding a mixture of the same into a dense bar-like shape. A method for making the molded solid body comprises the steps of performing kneading, crushing, and feeding operations of a mixture of the incinerated waste material and plastic waste material with a screw device 4 (4'), performing crushing compressing, and heat generating operations of the same with a rotary compressing means 6 (6') connected to the screw device 4 (4'), evaporating the water contained by expanding the same, i.e. releasing the same from the compressed state, and extruding the same into a bar-like shape through a perforated plate 8.

According to the present invention, the plastic waste material recovered at a thermal disposal plant includes thermoset resin and thermoplastic resin, in particular, e.g. polyethylene, polypropylene, polyvinyl chloride, polystyrene, etc. The incinerated waste material may be bottom ash provided from the bottom of an incinerator in the plant, fly ash provided from the flues, heat transfer sections, and dust collectors, and other products provided from the incinerators, all of which can be used. The ash-like incinerated waste material should be contained at a weight rate ranging from 10% to 80% (preferably, 20% to 70%) of the total mixture of waste material. If below 10%, the efficiency in processing the waste material is decreased. If over 80%, the bindingness of solidifiable plastic is reduced and thus, the shape retension of solid body becomes low.

Figure 1:
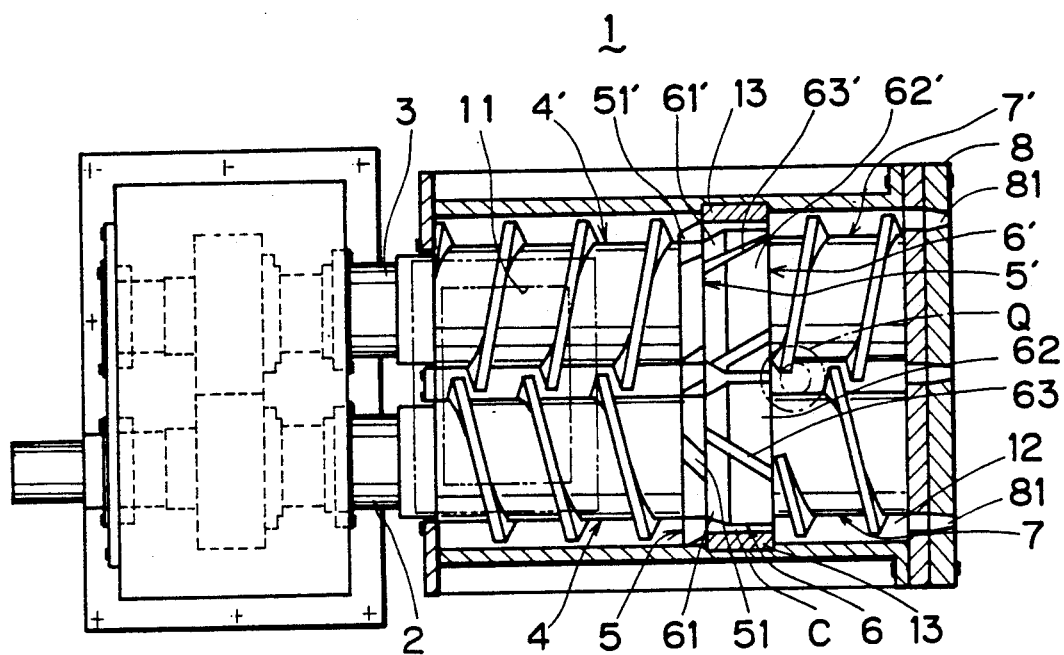
FIG. 1 is a partially cross sectional plan view showing an apparatus employed for a processing method according to the present invention.
Figure 2:
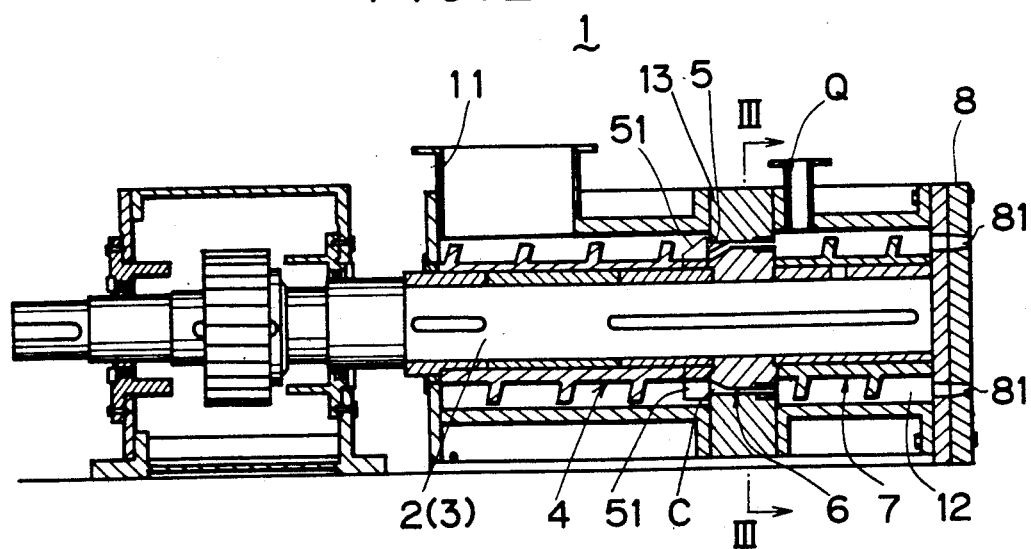
FIG. 2 is a partially cross sectional front view of the same.
Figure 3:
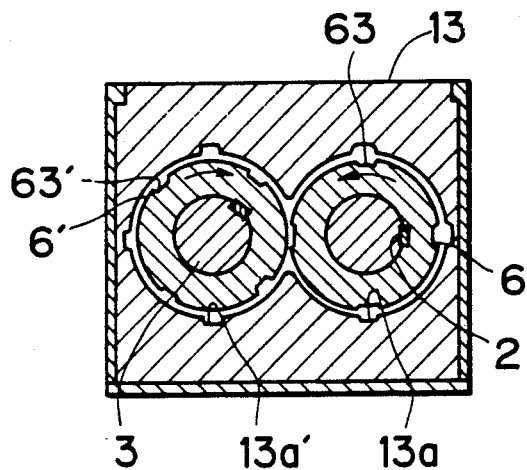
FIG. 3 is a cross sectional view taken along the line III—III of FIG. 2.

An apparatus for molding a solid body of incinerated waste material (refered to as a molding apparatus hereinafter) according to the present invention is either a two-shaft screw extruder shown in FIGS. 1 and 2 or a single-shaft screw extruder shown in FIGS. 6 and 7.

The molded solid body of incinerated waste material which is formed by binding ash-like incinerated waste material with solidifiable molten plastic (waste) material and extruding a mixture of the same into a dense bar-like shape is intensively rigid in which the particles of waste material are traped within the plastic binder on solidification, so that no toxic substance can leach therefrom. Thus, when disposed in the sea or the ground, the solid body will be prevented from causing pollution or contamination. Additionally, the solid body of incinerated waste material is so dense as to have a high specific gravity and thus, will sink positively in the water and remain at a particular location. Furthermore, it can be used preferably as a structural material for concrete or asphalt construction. The molded solid body according to the present invention, when converted from a bar-like shape to a plate-like form by a rolling mill, can be used as a constructional wall or floor material and also, because of the thermal insulating feature thereof, a thermal insulating material for air conditioning installation.

A method for processing according to the present invention will then be described. Both the incinerated waste material in ash-form and the plastic waste material are introduced at a ratio specified as described above into the screw device 4 (4'). While the plastic waste material in bulk is chipped and crushed into grains by the rotations of screw blades, it is mixed with the incinerated waste material in kneading operation and simultaneously, transferred forward. A kneaded mixture of the two waste materials is then fed into the rotary compressing means 6 (6') where it is further ground and compressed as the plastic waste material becomes molten due to frictional heat generation and at the same time, the water contained therein becomes hot. When released from the compressed state at the following step, the mixture of plastically flowable waste material becomes expanded abruptly. As the result, the solidifiable molten plastic waste material encapsulates the ash-like incinerated waste material while the heated water evaporates due to pressure drop. The flow of kneaded waste materials including less water is forcedly discharged through the perforated plate 8 and consequently, the ash-like incinerated waste material is delivered in the form of a bar-like molded solid body 9 as encapsulated by binding action of the solidifiable molten plastic waste material. The bar-like molded solid body 9 is substantially rigid, as described above, and is 1/10 to 1/20 of the original size. (Embodiment)

Preferred embodiments of the present invention will be described. FIGS. 1 to 4 show an extruder similar to the molding apparatus (an apparatus for encapsulating waste material containing highmolecular substances) proposed by the same inventor as in this Application and disclosed in foregoing Japanese U.M. Patent No. 60-1761752 issued on Feb. 23, 1989.

Throughout the drawings, the numeral 1 represents the complete arrangement of an extruder having at one end a material charge inlet 11 and at the other end, a forward discharge outlet 12. Between the charge inlet 11 and the discharge outlet 12, there are mounted a pair of rotary drive shafts 2 and 3 extending in parallel to each other. The rotary drive shafts 2 and 3 have, in the front half, spiral blades mounted on the peripheries thereof to form a pair of first screw devices 4 and 4' respectively which act as a two-shaft screw device. As rotating in the opposite directions (to feed from this side to the other side of FIG. 1), the first screw devices 4 and 4' in two-shaft arrangement intake the material charged, and crush plastic portions of the material into grains which are mingled with ash-like incinerated waste material and a mixture of the waste materials is then transferred forward.

The first two-shaft screw devices 4, 4' are at the distal end connected to a pair of disk members 5, 5' respectively which have helical blades 51, 51' formed thereon and are fixedly mounted on the drive shafts 2, 3 respectively. The disk members 5 and 5' are adapted to transfer the mixture of waste material from the two-shaft screw devices 4, 4' into rotary compressing means 6 and 6' by pressing. The rotary compressing means 6, 6' are fixedly mounted on the peripheries of the drive shafts 2, 3 respectively so as to connect with the disk members 5, 5'. The rotary compressing means 6, 6' comprise respectively conical sections 61, 61' situated at the upstream and cylindrical sections 62, 62' situated at the downstream. There are a multiplicity of equally spaced helical grooves 63, 63' formed in the circumferential surfaces of their respective compressing means 6, 6' and extending from the conical sections 61, 61' to the cylindrical sections 62, 62' respectively. Both the rotary compressing means 6 and 6' are so accommodated in a liner 13 that the clearance c between the liner 13 and the compressing means 6, 6' is adjustable. The liner 13 has a multiplicity of equally spaced helical grooves 13a and 13a' formed in the inner wall thereof and extending at angles to the helical grooves 63 and 63' respectively. The mixture of waste material fed into the clearance c betweem the liner 13 and the rotary compressing means 6, 6' is compressed and simultaneously, crushed in grains by grinding action during rotation, thus generating heat due to compression. This causes the plastic waste material to melt and discharge heated water.

The rotary compressing means 6, 6' are in turn connected to a pair of second two-shaft screw devices 7, 7' respectively where the compressed state of the mixture is released. On releasing, the heated water evaporates due to an immediate pressure drop and will escape in vapor form through an exhaust vent Q disposed above the screw devices 7, 7'. The mixture including less water is then kneaded and compresses by the second two-shaft screw devices 7, 7' extending coaxially of the first screw devices 4, 4', and finally, discharged through a multiplicity of forwardly narrowed bores 81 in a perforated plate 8 upon being pressed intensively. At the time, the incinerated waste material is bound through the binding action of the solidifiable molten plastic material and thus, delivered in the form of a bar-like solid body 9.

Figure 4:
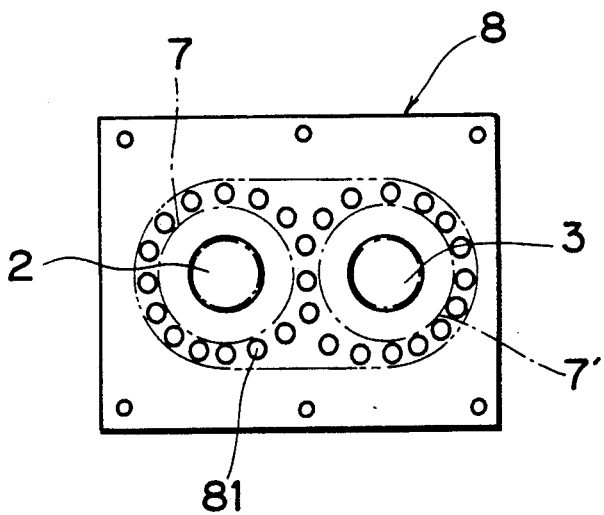
FIG. 4 is a front view of a plate having a multiplicity of openings.
Figure 5:
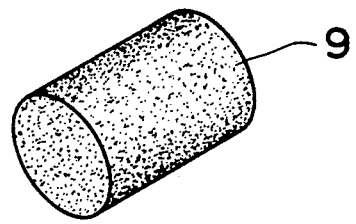
FIG. 5 is a perspective view showing a molded solid body according to the present invention.

The perforated plate 8 has two groups of the bores 81 formed therein coaxially of the rotary drive shafts 2 and 3 respectively and arranged corresponding to the circumferential peripheries of their respective second two-shaft screw devices 7 and 7' as shown in FIG. 4 and is detachably mounted in the forward discharge outlet 12. The group of the bores 81 may be provided in a polygonal or cross form rather than a circular form in the embodiment, as the plate 8 is replaceable.

The molded solid body 9 extruded through the bores 81 is measured about 15 to 40 mm in diameter and about 35 to 60 mm in length, and dense and rigid enough to use as a structural material for concrete construction.

Figure 6:
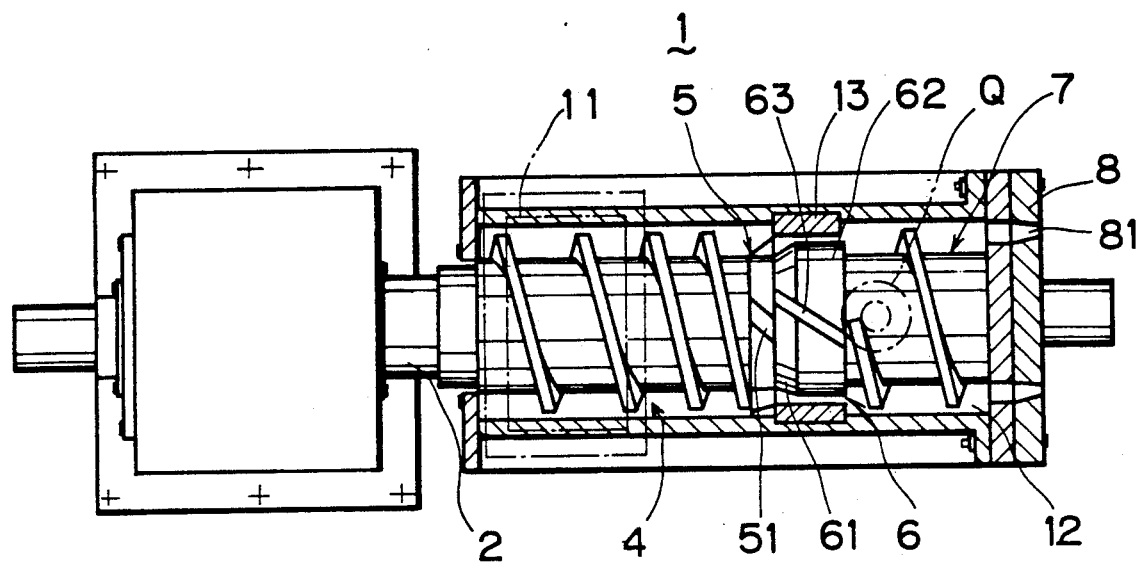
FIGS. 6 and 7 are views, similar to FIG. 1, showing other embodiments.

FIG. 6 shows a single-shaft type apparatus 1 in which a single rotary drive shaft 2 has a spiral blade mounted on the front half periphery thereof so as to form a first single shaft screw device 4. The screw device 4 has at the distal end a rotary member 5 with helical blades 51 and a rotaty compressing means 5, both of which are consecutively mounted in the manner described previously. The rotary compressing means 6 is in turn connected to a second screw device 7 mounted coaxially of the first screw device 4. On the forward end of the second screw device 7, there is provided a dischare outlet 12 in which a perforated plate 8 is disposed. The incinerated waste material and plastic waste material charged from a charge inlet 11 of the apparatus are kneaded and crushed through the movements of the first screw device 4, rotary member 5 with the helical blades, and rotary compressing means 6. Then, the plastic waste material melts down due to the heat generated through compression and friction. Thus, the ash-like incinerated waste material can be bound closely with the solidifiable molten plastic waste material, when they are forced out through the bores 81 of a perforated plate 8 with the second screw device 7, and then, delivered in the form of a bar-like solid body 9.

Figure 7:
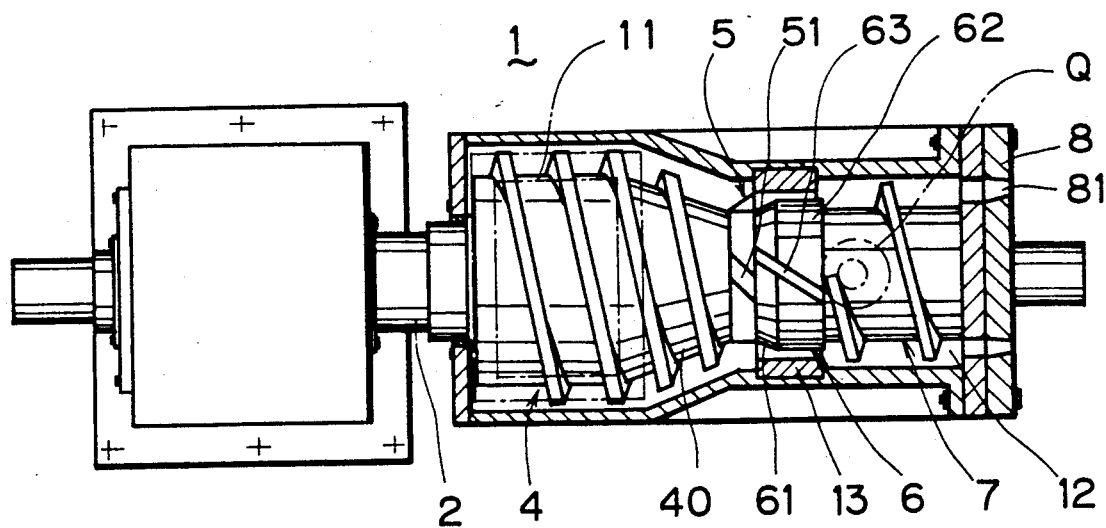

FIG. 7 shows another single-shaft type screw apparatus similar to the one shown in FIG. 6, in which the screw device 4 has at the downstream end a forwardly narrowed taper portion 40 thereof. The inner wall of a casing in the apparatus 1 is also shaped in a tapered configuration to correspond to the taper portion 40. Consequently, the material to be processed is, upon reaching the taper portion 40 of the screw device 4, intensively compressed before entering the rotary compressing means 6 as the passing space in the apparatus is gradually reduced. Thereby, the crushing and generation of compressing and frictional heat can be executed more effectively with the compressing means 6.

The other components than the one described above, as shown in FIGS. 6 and 7, are similar in respect of function to the ones shown in FIGS. 1 to 4. Hence, as similar components are represented by similar numbers throughout the drawings, the detailed description concerning to FIGS. 6 and 7 is omitted.

The result of a test in which the bar-like molded solid body of incinerated waste material produced by each of the aforesaid apparatuses has been examined on its compressive strength and applicability to disposal in the water will be described.

(i) Processed Material

The incinerated waste material having the specific gravity of 0.94 in bulk which had been supplied in ash form from an incinerator and the plastic waste material in the form of chips of approximately less than 70mm square broken off from foamed polystyrene food packages and polyethylene kerosine or bottle containers, both of which were the same in weight, were fed into the above-mentioned apparatus and delivered in the form of a bar-like molded solid body having a diameter of 28 mm. The solid body had the specific gravity of 1.8 which corresponded to about 1/13 to 1/18 of the original size of the waste materials (i.e. a rate of volume reduction). It is thus apparent that the ash-like incinerated waste material was closely bound with the molten plastic waste material. Accordingly, the molded solid body can consistently remain at a particular location when disposed in the water.

(ii) Applicability to Disposal in Water

The molded solid body was immersed in the water and kept at an ambient temperature for a period of 21 days. During the immersion, the water showed no sign of turbidity or pollution which resulted from the leaching of metallic substance.

(iii) Measurement of Compressive Strength

A test piece of the solid bodies measuring 28 mm in diameter and 28 mm in length was examined on the comressive strength with the use of a compression test machine. The result was that it broke down when the pressure was 1.085 kg. It means that the solid body has the compressive strength of about 170 kg/cm$^2$ and is thus appropriate to use as a structural material for concrete and asphalt construction. When the bar-like solid body increases in diameter (e.g. 70 to 80 mm), it can also be used as a common constructional wall or floor material. Additionally, the solid body consists mainly of incinerated waste material and plastic waste material and thus, offers the high quality of thermal insulation so as to use as a thermal insulating material for air conditioning installation.

The illustrated apparatus are only shown as embodiments of the present invention, and it will be understood that the apparatuses disclosed in the previous Application described above may be used with equal success.

The molded solid body of incinerated waste material according to the present invention is formed by closely binding ash-like incinerated waste material with solidifiable molten plastic waste material and extruding a mixture of the same into a bar-like shape, thus increasing the specific gravity, so that it can consistently remain at a particular location without drifting when disposed in the water. Additionally, the ash-like incinerated waste material is encapsulated in the plastic waste binder so that the hostile substances contained therein can remain trapped, which permits no environmental pollution nor contamination to occur. The solid body which is increased in density and rigidity due to being bonded together by the plastic material can be used as a structural material for concrete or asphalt construction. Furthermore, the solid body can be used, particularly when fabricated into a plate-like shape, as a common constructional wall and foor material or a thermal insulating material for a wide range of industrial applications as having the features of heat resistance and thermal insulation.

The solid body is also formed in such a manner that both the incinerated waste and plastic waste materials are kneaded and compressed at one time while the plastic material becomes molten through frictional heat generation. This allows two kinds of waste materials to be efficiently processed together in one particular procedure of method. Additionally, this method eliminates the use of a large-scale incinerator for thermal disposal of plastic waste. The solid body produced is 1/10 to 1/20 of the complete waste material in volume so that it can be handled with ease during transportation and, when recycled for land-fill work, render the ground rigid and robust. In case of disposal in the sea, the solid body will cause no environmental pullution and even constitute in bulk a fishery sea-bed.

According to the present invention, two kinds of waste materials can be processed at one time and recycled for re-use. This makes it possible to vigorously eliminate the problems of disposal of a variety of waste material which have been of great concern. Particularly in view of the fact that the amount of waste material, particularly in cities, is huge in number in which about 15% is ash content while 10% is plastic material, the present invention deserves public attention.

I claim:

1. A method of making a molded solid body of incinerated waste material comprising the ordered steps of
   kneading, crushing, and feeding a mixture of ash-like incinerated waste and plastic materials with a pair of first screws;
   grinding and compressing the same to generate heat with a rotary compressing means connected to said pair of first screws;
   releasing the same from its compressed state to evaporate water therefrom; and
   extruding the same through a replaceable perforated plate having a plurality of tapered perforations of a polygonal or cross-form cross section into a dense bar-like shape by a pair of second screws coaxial with said pair of first screws.

* * * * *